(12) United States Patent
Bernheim et al.

(10) Patent No.: US 9,438,312 B2
(45) Date of Patent: Sep. 6, 2016

(54) SYSTEM AND METHOD FOR INFERRING SCHEMATIC RELATIONSHIPS BETWEEN LOAD POINTS AND SERVICE TRANSFORMERS

(71) Applicants: Astrolink International LLC, Bethesda, MD (US); Dominion Energy Technologies, Inc., Richmond, VA (US)

(72) Inventors: Henrik F. Bernheim, Denver, CO (US); Jerritt Hansell, Boulder, CO (US); Marcia Reid Martin, Longmont, CO (US); Jason Mark Bullard, Boulder, CO (US)

(73) Assignees: Astrolink International LLC, Bethesda, MD (US); Dominion Energy Technologies, Inc., Richmond, VA (US)

( * ) Notice: Subject to any disclaimer, the term of this patent is extended or adjusted under 35 U.S.C. 154(b) by 487 days.

(21) Appl. No.: 13/911,849

(22) Filed: Jun. 6, 2013

(65) Prior Publication Data
US 2014/0361907 A1 Dec. 11, 2014

(51) Int. Cl.
*G01R 15/18* (2006.01)
*H02J 3/14* (2006.01)
*G08C 19/16* (2006.01)
*G08C 19/06* (2006.01)
*G08B 5/22* (2006.01)
*H04B 3/54* (2006.01)

(52) U.S. Cl.
CPC ............... *H04B 3/546* (2013.01); *Y04S 20/48* (2013.01)

(58) Field of Classification Search
CPC ...................................................... H02J 7/025
See application file for complete search history.

(56) References Cited

U.S. PATENT DOCUMENTS 4,200,770 A 4/1980 Hellman et al.
4,371,867 A 2/1983 Gander
(Continued)

FOREIGN PATENT DOCUMENTS

CN 101770007 7/2010
EP 0 629 098 12/2001
(Continued)

OTHER PUBLICATIONS

Cuthbert Nyack, "Convolution and Autocorrelation," http://cnyack.homestead.com/files/aconv/convau1 .ht, Web. (Jun. 7, 2009).
(Continued)

*Primary Examiner* — Jennifer Mehmood
*Assistant Examiner* — Pameshanand Mahase
(74) *Attorney, Agent, or Firm* — Withrow & Terranova, PLLC (57) ABSTRACT

A system and method for identifying which of several candidate service transformers is powering a specific service point an electrical distribution grid are disclosed. An audio-frequency electrical signal, the detection signal, is injected onto the power line at the service point via a meter socket or electrical outlet. The Transmitter for the detection signal may be a portable device or it may be incorporated into an electrical meter. The audible or mechanical resonance caused in the service transformer by the detection signal is detected and recorded using an accelerometer or directional microphone in a Receiver. A variety of methods for fixing the Receiver at or in proximity to the service transformers are disclosed in order to adapt to variations in the siting and housing of service transformers. A variety of mechanisms and methods for collecting detection events are disclosed.

32 Claims, 9 Drawing Sheets

(56) References Cited

U.S. PATENT DOCUMENTS

| | | |
|---|---|---|
| 6,212,560 B1 | 4/2001 | Fairchild |
| 6,366,062 B2 | 4/2002 | Beretich et al. |
| 6,373,399 B1 | 4/2002 | Johnson et al. |
| 6,690,655 B1 | 2/2004 | Miner et al. |
| 6,961,641 B1 | 11/2005 | Forth et al. |
| 7,069,117 B2 | 6/2006 | Wilson et al. |
| 7,188,003 B2 | 3/2007 | Ransom et al. |
| 7,236,765 B2 | 6/2007 | Bonicatto et al. |
| 7,280,931 B1 | 10/2007 | Kim et al. |
| 7,369,579 B2 | 5/2008 | Logvinov et al. |
| 7,571,028 B2 | 8/2009 | Lapinski et al. |
| 7,701,330 B2 | 4/2010 | Iwamura |
| 7,870,600 B2 | 1/2011 | Huotari et al. |
| 7,873,077 B2 | 1/2011 | Downey et al. |
| 7,948,255 B2 | 5/2011 | Shim et al. |
| 8,207,726 B2 | 6/2012 | Vaswani et al. |
| 8,639,922 B2 | 1/2014 | Phatak |
| 8,639,992 B2 | 1/2014 | Haufe et al. |
| 8,711,995 B2 | 4/2014 | Glende |
| 8,737,555 B2 | 5/2014 | Haug et al. |
| 8,872,667 B2 | 10/2014 | Bhageria et al. |
| 2001/0018561 A1* | 8/2001 | Tanida ............... A61B 5/0537 600/547 |
| 2001/0037378 A1* | 11/2001 | Hirayama ............ G06Q 20/40 709/219 |
| 2002/0069299 A1 | 6/2002 | Rosener |
| 2002/0089927 A1 | 7/2002 | Fischer et al. |
| 2003/0098671 A1 | 5/2003 | Hochgraf |
| 2004/0062267 A1 | 4/2004 | Minami et al. |
| 2004/0110044 A1 | 6/2004 | McArthur et al. |
| 2004/0226621 A1 | 11/2004 | Phillips et al. |
| 2004/0227621 A1 | 11/2004 | Cope et al. |
| 2005/0005150 A1 | 1/2005 | Ballard |
| 2005/0017848 A1 | 1/2005 | Flen et al. |
| 2005/0043860 A1* | 2/2005 | Petite .................. H02J 3/14 700/291 |
| 2005/0144437 A1 | 6/2005 | Ransom et al. |
| 2005/0207079 A1 | 9/2005 | Tiller et al. |
| 2006/0152344 A1 | 7/2006 | Mowery et al. |
| 2007/0101438 A1 | 5/2007 | Govindarajan |
| 2007/0114987 A1 | 5/2007 | Kagan |
| 2007/0162550 A1* | 7/2007 | Rosenberg ........... H04L 12/581 709/206 |
| 2007/0208521 A1 | 9/2007 | Petite et al. |
| 2007/0237181 A1 | 10/2007 | Cho et al. |
| 2007/0271383 A1 | 11/2007 | Kim et al. |
| 2007/0297425 A1 | 12/2007 | Chirco et al. |
| 2008/0040479 A1 | 2/2008 | Bridge et al. |
| 2008/0109387 A1 | 5/2008 | Deaver et al. |
| 2008/0209481 A1 | 8/2008 | Barrett |
| 2008/0273521 A1 | 11/2008 | Shao |
| 2008/0312851 A1 | 12/2008 | Kagan et al. |
| 2009/0027061 A1 | 1/2009 | Curt et al. |
| 2009/0088907 A1 | 4/2009 | Lewis et al. |
| 2009/0096416 A1 | 4/2009 | Tonegawa et al. |
| 2009/0210197 A1 | 8/2009 | Cleary |
| 2009/0219932 A1 | 9/2009 | Kobayashi |
| 2009/0240504 A1* | 9/2009 | Pang .................. G10L 19/008 704/500 |
| 2009/0304101 A1 | 12/2009 | LoPorto et al. |
| 2010/0005273 A1 | 1/2010 | Lee et al. |
| 2010/0007219 A1 | 1/2010 | de Buda et al. |
| 2010/0007336 A1* | 1/2010 | de Buda ................ H04B 3/56 324/127 |
| 2010/0010857 A1 | 1/2010 | Fadell |
| 2010/0054349 A1 | 3/2010 | Spencer |
| 2010/0134089 A1 | 6/2010 | Uram et al. |
| 2010/0141392 A1 | 6/2010 | Jo et al. |
| 2010/0188260 A1 | 7/2010 | Cornwall et al. |
| 2010/0217549 A1 | 8/2010 | Galvin et al. |
| 2010/0217550 A1 | 8/2010 | Crabtree et al. |
| 2010/0262313 A1 | 10/2010 | Chambers et al. |
| 2010/0286840 A1 | 11/2010 | Powell et al. |
| 2010/0296560 A1 | 11/2010 | Sadan et al. |
| 2010/0306533 A1 | 12/2010 | Phatak |
| 2011/0035073 A1 | 2/2011 | Ozog |
| 2011/0103429 A1* | 5/2011 | Tanaka ................ G08C 17/02 375/135 |
| 2011/0121654 A1 | 5/2011 | Recker et al. |
| 2011/0130992 A1 | 6/2011 | Kolwalkar et al. |
| 2011/0133655 A1 | 6/2011 | Recker et al. |
| 2011/0140911 A1 | 6/2011 | Pant et al. |
| 2011/0196546 A1 | 8/2011 | Muller et al. |
| 2011/0216747 A1* | 9/2011 | Shao ................ H04W 56/0065 370/338 |
| 2011/0224935 A1 | 9/2011 | Hampel et al. |
| 2011/0267202 A1 | 11/2011 | Efthymiou et al. |
| 2011/0285382 A1 | 11/2011 | Kolwalkar et al. |
| 2012/0036250 A1 | 2/2012 | Vaswani et al. |
| 2012/0041696 A1 | 2/2012 | Sanderford et al. |
| 2012/0052870 A1* | 3/2012 | Habicher .............. H04W 8/16 455/456.1 |
| 2012/0062210 A1 | 3/2012 | Veillette |
| 2012/0075099 A1* | 3/2012 | Brown .................. G08B 5/36 340/540 |
| 2012/0139554 A1 | 6/2012 | Parsons |
| 2012/0155557 A1 | 6/2012 | Bush et al. |
| 2012/0158329 A1 | 6/2012 | Hurri et al. |
| 2012/0185838 A1 | 7/2012 | Schwartzman et al. |
| 2012/0195355 A1 | 8/2012 | El-Essawy et al. |
| 2012/0201155 A1 | 8/2012 | Du et al. |
| 2012/0232915 A1 | 9/2012 | Bromberger |
| 2012/0242499 A1 | 9/2012 | Ree et al. |
| 2012/0245869 A1 | 9/2012 | Ansari |
| 2012/0265355 A1 | 10/2012 | Bernheim et al. |
| 2012/0275526 A1 | 11/2012 | Hughes et al. |
| 2012/0310424 A1 | 12/2012 | Taft et al. |
| 2012/0310558 A1 | 12/2012 | Taft et al. |
| 2012/0313620 A1 | 12/2012 | Swarztrauber et al. |
| 2012/0314782 A1 | 12/2012 | Boivin et al. |
| 2012/0314868 A1 | 12/2012 | Bernheim et al. |
| 2012/0316696 A1 | 12/2012 | Boardman et al. |
| 2012/0323388 A1 | 12/2012 | Littrell et al. |
| 2013/0013232 A1 | 1/2013 | Parwal et al. |
| 2013/0031201 A1 | 1/2013 | Kagan et al. |
| 2013/0034086 A1 | 2/2013 | Martin et al. |
| 2013/0132555 A1 | 5/2013 | Wang et al. |
| 2013/0151177 A1 | 6/2013 | Hughes |
| 2013/0193767 A1 | 8/2013 | Carralero et al. |
| 2013/0204450 A1 | 8/2013 | Kagan et al. |
| 2014/0035372 A1 | 2/2014 | Normoyle et al. |
| 2014/0062719 A1 | 3/2014 | Rowitch et al. |
| 2014/0118163 A1 | 5/2014 | Li et al. |
| 2014/0172723 A1 | 6/2014 | Borisov et al. |
| 2014/0191568 A1* | 7/2014 | Partovi ................ H02J 7/025 307/9.1 |
| 2014/0233620 A1 | 8/2014 | Bernheim et al. |
| 2014/0233662 A1 | 8/2014 | Hansell et al. |
| 2014/0236365 A1 | 8/2014 | Martin et al. |
| 2014/0236366 A1 | 8/2014 | Livadaras et al. |
| 2014/0236506 A1 | 8/2014 | Nikovski et al. |
| 2014/0300210 A1 | 10/2014 | Abi-Ackel et al. |
| 2014/0359595 A1 | 12/2014 | Sehgal et al. |
| 2014/0368189 A1 | 12/2014 | Bernheim et al. |
| 2015/0010093 A1 | 1/2015 | Hansell et al. |

FOREIGN PATENT DOCUMENTS

| | | |
|---|---|---|
| EP | 1 901 145 | 3/2008 |
| EP | 2 566 125 | 3/2013 |
| JP | 2003-339120 | 11/2003 |
| JP | 2003-259696 | 12/2003 |
| JP | 2004147063 A | 5/2004 |
| JP | 2005252671 A | 9/2005 |
| JP | 2006262570 A | 9/2006 |
| JP | 2007-185083 | 7/2007 |
| JP | 2008-508781 | 3/2008 |
| JP | 2008-098812 | 4/2008 |
| JP | 2008-124859 | 5/2008 |
| JP | 2013-005718 | 1/2013 |

(56) References Cited

FOREIGN PATENT DOCUMENTS

| WO | WO2010141859 | 12/2010 |
|---|---|---|
| WO | 2014006662 A1 | 1/2014 |

OTHER PUBLICATIONS

Dermot Collins et al., "Transmission on Power Line Cables," Telektronikk 2/3, (1999).
Chong Hock K. Goh, "A Current Study of Automatic Meter Reading Solutions via Power Line Communications," http://wpweb2k.gsia.cmu.edu/ceic/publicatons.htm. ((Published 2003 or later as evidenced by the bibliography)).
K.B. Ha, "Power Line Communication Technology," Presentation at Hong Kong Institute of Engineers Seminar on Last Mile Technology, (Jun. 20, 2003).
Olaf G. Hooijen, "A Channel Model for the Residential Power Circuit Used as a Digital Communications Medium," IEEE Transactions on Electromagnetic Compatibilty, 40(4): pp. 331-336, (Nov. 1998).
Luis F. Montoya, "Power Line Communications Performance Overview of the Physical Layer of Available Protocols," Thesis of Research, University of Florida, Gainesville, Florida, pp. 1-15. (publication date unknown).
J.E. Newbury, "Efficient Communication Services Using the Low Voltage Distribution Line," Proceedings of 2002 PES Winter Meeting, pp. 579-591, (2002).
Niovi Pavlidou, et al., "Power Line Communications: State of the Art and Future Trends," IEEE Communications Magazine, 41(4): pp. 34-40, (Apr. 2003).
Gerald Schickhuber and Oliver McCarthy, "Control Using Power Lines—A European View," Computing & Control Engineering Journal, 8(4): pp. 180-184, (Aug. 1997).
Petrus A. Hanse Van Rensburg and Hendrik C. Ferreira, "Design of a Bidirectional Impedance-Adapting Transformer Coupling Circuit for Low-Voltage Power-Line Communications," IEEE Transactions on Power Delivery, 20(1); pp. 64-70 (Jan. 2005).
Universal Powerline Bus Communication Technology Overview, http://pulseworx.com/downloads/upb/UpbOverview.pdf (Jan. 8, 2002).
X-10 (U.S.A.) Inc., X-10.RTM. Powerhouse (TM) Technical Note, "The X-10 Powerhouse Power Line Interface Model #PL513 and Two-Way Power Line Interface Model #TW523", 12 pages, Revision 2.4, Dave Rye, (1991).
Moreno-Munoz A., et al., "Integrating Power Quality to Automated Meter Reading", IEEE Industrial Electronics Magazine, IEEE, US, vol. 2, No. 2, pp. 10-18 (Jun. 17, 2008).
Moonsuk Choi, et al., "Design of Integrated Meter Reading System based on Power-Line Communication", Power Line Communications and Its Applications, IEEE, International Symposium, pp. 280-284 (Apr. 2, 2008).
Paola Bresesti, et al., "SDNO: Smart Distribution Network Operation Project", Power Engineering Society General Meeting, IEEE, pp. 1-4 (Jun. 1, 2007).
EnergyIdeas Clearinghouse PTR #6. Product and Technology Review. MicroPlanet® Voltage Regulators for residential and small commercial applications. http://www.energyideas.org/documents/factsheets/PTR/Microplanet.pdf pp. 1-5 (Jun. 4, 2008).
Fierce Energy Daily. "Dominion Conservation Voltage Reduction software reduces energy use by 2.8%." http://www.fierceenergy.com/story/dominion-conservation-voltage-reduction-software-reduces-energy-use-28/2011-09-27, pp. 1-3. (Sep. 17, 2011).
RenewGRID. "CVR has Potential Beyond Pushing Efficiencies on Feeders." Bates, Michael. http://www.renew-grid.com/e107 plugins/contenl/contenl.php?conten1.8215, pp. 1-2. (Mar. 25, 2012).
Angelo Baggini "Handbook of Power Quality" (Jun. 2008).
Sherman et al, "Location Authentication through Power Line Communication: Design, Protocol, and Analysis of a New Out of Band Strategy", 2010, Cyber Defense Lab, Department of CSEE, University of Maryland, Baltimore County, IEEE, p. 279-284 (2010).

International Search Report in Application No. PCT/US2014/041396, dated Oct. 29, 2014.
File History for U.S. Serial No. PCT/US2014/041396.
File History for U.S. Appl. No. 14/304,035.
File History for U.S. Serial No. PCT/US2014/042300.
File History for U.S. Appl. No. 14/304,648.
File History for U.S. Serial No. PCT/US2014/042393.
File History for U.S. Appl. No. 12/480,493.
File History for U.S. Serial No. PCT/US2009/046644.
File History for U.S. Appl. No. 13/448,005.
File History for U.S. Serial No. PCT/US2012/033789.
File History for U.S. Appl. No. 13/493,983.
File History for U.S. Serial No. PCT/US2012/041971.
File History for U.S. Appl. No. 13/566,481.
File History for U.S. Serial No. PCT/US2012/049524.
File History for U.S. Appl. No. 13/888,102.
File History for U.S. Serial No. PCT/US2014/016535.
File History for U.S. Appl. No. 13/896,029.
File History for U.S. Serial No. PCT/US2014/016538.
File History for U.S. Appl. No. 13/871,944.
File History for U.S. Serial No. PCT/US2014/016540.
M. Dilek, Integrated Design of Electrical Distribution Systems: Phase Balancing and Phase Prediction Case Studies. 2001, http://scholar.lib.vt.edu/theses/available/etd-11132001-222401/unrestricted/mdilekETD.pdf.
"TWACS Low Frequency Power Line Communication Signals Problematic to Public Health." pp. 1-20; dated May 3, 2013, http://www.eiwellspring.org/smartmeter/TWACS.htm.
G3-PLC Alliance, "The G3 PLC Alliance Unveils its Interoperability process." Paris, Oct. 2012—The G3-PLC Alliance, http:/www.g3-plc.com/, p. 1.
Prime Alliance Official Web Site http://www.prime-alliance.org.
McGhee et al., —"Smart High Voltage Substation based on IEC 61850 Process Bus and IEEE 1588 Time Synchronization" 2010 First IEEE International Conference on Smart Grid Communications, published/presented on Oct. 4-6, 2010.
Pallares-Lopez et al., "Embedding synchronism in SmartGrid with IEEE1588-based for Intelligent Electronics" 2010 First IEEE International Conference on Smart Grid Communications, published/presented Oct. 4-6, 2010.
International Search Report for PCT/US2014/016538, mailed Jun. 16, 2014, 3 pages.
International Preliminary Report on Patentability for PCT/US2014/016538, mailed Sep. 3, 2015, 10 pages.
International Search Report for PCT/US2014/016540, mailed Jun. 17, 2014, 3 pages.
International Preliminary Report on Patentability for PCT/US2014/016540, mailed Sep. 3, 2015, 9 pages.
International Search Report for PCT/US2014/016535, mailed Jun. 3, 2014, 2 pages.
International Preliminary Report on Patentability for PCT/US2014/016535, mailed Sep. 3, 2015, 8 pages.
International Search Report and Written Opinion for PCT/US2014/042300, mailed Oct. 20, 2014, 16 pages.
International Search Report and Written Opinion for PCT/US2014/042393, mailed Oct. 20, 2014, 15 pages.
International Search Report for PCT/US2009/046644, mailed Mar. 2, 2010, 7 pages.
International Preliminary Report on Patentability for PCT/US2009/046644, mailed Dec. 6, 2010, 10 pages.
International Search Report for PCT/US2012/033789, mailed Sep. 6, 2012, 4 pages.
International Search Report for PCT/US2012/041971, mailed Dec. 7, 2012, 5 pages.
International Search Report for PCT/US2012/049524, mailed Jan. 3, 2013, 3 pages.
Non-Final Office Action for U.S. Appl. No. 13/566,481, mailed Aug. 7, 2015, 27 pages.
Non-Final Office Action for U.S. Appl. No. 13/493,983, mailed Feb. 5, 2014, 11 pages.
Final Office Action for U.S. Appl. No. 13/493,983, mailed Oct. 31, 2014, 12 pages.

(56) References Cited

OTHER PUBLICATIONS

Non-Final Office Action for U.S. Appl. No. 13/448,005, mailed Sep. 11, 2014, 20 pages.
Non-Final Office Action for U.S. Appl. No. 13/448,005, mailed Apr. 15, 2015, 22 pages.
Non-Final Office Action for U.S. Appl. No. 12/480,493, mailed Jul. 16, 2012, 24 pages.
Notice of Allowance and Examiner-Initiated Interview Summary for U.S. Appl. No. 12/480,493, mailed Jun. 20, 2013, 13 pages.
Non-Final Office Action for U.S. Appl. No. 13/896,029, mailed Sep. 18, 2015, 16 pages.
Non-Final Office Action for U.S. Appl. No. 13/871,944, mailed Oct. 16, 2015, 13 pages.
Non-Final Office Action for U.S. Appl. No. 13/888,102, mailed Jul. 9, 2015, 18 pages.
Search Report for Japanese Patent Application No. 2011-512749, search date Aug. 14, 2013, 29 pages.
Office Action for Japanese Patent Application No. 2011-512749, drafting date Sep. 4, 2013, 7 pages.
Final Office Action for U.S. Appl. No. 13/888,102, mailed Dec. 24, 2015, 18 pages.
International Preliminary Report on Patentability for PCT/US2014/041396, mailed Dec. 17, 2015, 8 pages.
International Preliminary Report on Patentability for PCT/US2014/042300, mailed Dec. 23, 2015, 9 pages.
International Preliminary Report on Patentability for PCT/US2014/042393, mailed Dec. 23, 2015, 11 pages.
Office Action for Canadian Patent Application No. 2,727,034, mailed Nov. 26, 2015, 4 pages.
Decision of Final Rejection for Japanese Patent Application No. 2014-119504, mailed Nov. 10, 2015, 5 pages.
Translation of Decision to Grant for Japanese Patent Application No. 2014-119505, mailed Dec. 15, 2015, 3 pages.
Office Action for Cuban Patent Application No. 2015-0088, mailed Oct. 30, 2015, 3 pages.
Non-Final Office Action for U.S. Appl. No. 14/304,035, mailed Feb. 25, 2016, 22 pages.
Notice of Allowance for U.S. Appl. No. 13/566,481, mailed Feb. 26, 2016, 7 pages.
Non-Final Office Action for U.S. Appl. No. 14/720,780, mailed Feb. 26, 2016, 7 pages.
Sendin, Alberto, et al., "Enhanced Operation of Electricity Distribution Grids Through Smart Metering PLC Network Monitoring, Analysis and Grid Conditioning," Energies, vol. 6, Issue 1, Jan. 21, 2013, www.mdpi.com/journal/energies, pp. 539-556.
Wetula, Andrzej, "A Hilbert Transform Based Algorithm for Detection of a Complex Envelope of a Power Grid Signals—an Implementation," Journal of Electrical Power Quality and Utilisation, vol. 14, Issue 2, 2008, EPQU Journal, pp. 13-18.
Partial Supplementary European Search Report for European Patent Application No. 14754343.3, mailed Feb. 8, 2016, 5 pages.
International Search Report and Written Opinion for International Patent Application No. PCT/US2015/058423, mailed Jan. 19, 2016, 12 pages.
International Search Report and Written Opinion for International Patent Application No. PCT/US2015/058492, mailed Feb. 26, 2016, 18 pages.
International Search Report and Written Opinion for International Patent Application No. PCT/US2015/063752, mailed Mar. 24, 2016, 16 pages.
Colson, C.M., "Algorithms for Distributed Decision-Making for Multi-agent Microgrid Power Management," IEEE Power and Energy Society General Meeting, Jul. 24-29, 2011, San Diego, California, IEEE, pp. 1-8.
Final Office Action for U.S. Appl. No. 13/896,029, mailed Jun. 22, 2016, 22 pages.
Final Office Action for U.S. Appl. No. 13/871,944, mailed Jun. 21, 2016, 22 pages.
Final Office Action for U.S. Appl. No. 13/448,005, mailed Jun. 6, 2016, 11 pages.
Extended European Search Report for European Patent Application No. 14754343.3, mailed May 24, 2016, 12 pages.
European Search Report for European Patent Application No. 14754343.3, mailed Jun. 10, 2016, 1 page.
Examination Report for European Patent Application No. 09759619.1, mailed May 13, 2016, 7 pages.

\* cited by examiner

SYSTEM AND METHOD FOR INFERRING SCHEMATIC RELATIONSHIPS BETWEEN LOAD POINTS AND SERVICE TRANSFORMERS

FIELD OF THE INVENTION

The present invention is directed toward the use of signals on the electrical distribution grid to infer the boundaries of a service transformer area network, and specifically for identifying the service transformer supplying power to a metered load point.

BACKGROUND OF THE INVENTION

Electrical Distribution Substations contain one or more Substation Transformers, which step down the voltage from high transmission line levels (typically 130 kV to 700 kV) to the medium voltage levels (typically from 4 kV to about 35 kV) at which power is distributed to consumers within a distribution service area. At the edge of the Distribution Grid are a number of Service Transformers, which transform the medium voltage of the distribution grid to the low voltages (in the US, typically 120, 208, 240, 277, or 480) required for commercial, industrial, and residential consumers. Other voltages in addition to some of these can be used elsewhere in the world. Each Service Transformer powers one or more metered loads. A metered load can be a dwelling, a commercial or industrial building, an element of municipal infrastructure such as a series of street lamps, agricultural apparatus such as irrigation systems, or any other metered construct which can draw power from the distribution grid, or combinations of these.

Other than the wires connecting a consumer load and the associated meter to a service transformer, the service transformer is the outermost element of the distribution grid before the power is actually delivered to a consumer. A meter is typically attached at the point where the power from the service transformer is delivered to the consumer. Service transformers can be three-phase, or single phase, as can meters. The electrical apparatus included within the power-flow path from a service transformer to the collection of at least one electrical meter is referred to as a Transformer Area Network (TAN). A TAN can have a radial topology, as is common in the US, or it can have a linear or "bus" topology, as is more common in Europe and elsewhere in the world.

Traditionally, reading meters was one of the largest operational costs incurred by electrical utilities. Originally, electric meters were analog devices with an optical read-out that had to be manually examined monthly to drive the utility billing process. Beginning in the 1970s, mechanisms for digitizing meter data and automating its collection began to be deployed. These mechanisms evolved from walk-by or drive-by systems where the meter would broadcast its current reading using a short-range radio signal, which was received by a device carried by the meter reader. These early systems were known as Automated Meter Reading systems or AMRs. Later, a variety of purpose-built data collection networks, commonly employing a combination of short-range RF repeaters in a mesh configuration with collection points equipped with broadband backhaul means for transporting aggregated readings began to be deployed.

These networks were capable of two-way communication between the "metering head-end" at a utility service center and the meters at the edge of this data collection network, and are generally called an Advanced Metering Infrastructure or AMI. AMIs can collect and store readings frequently, typically as often as every 15 minutes, and can report them nearly that often. They can read any meter on demand provided that this feature is used sparingly, and can connect or disconnect any meter on demand as well. AMI meters can pass signals to consumer devices for the purpose of energy conservation, demand management, and variable-rate billing. Because the AMI network is separate from the power distribution grid except for the intersection at the meters, AMI meters are neither aware of nor sensitive to changes in the grid topology or certain conditions on the grid. Nonetheless, the introduction of AMI is often the first step in the direction of a true Smart Grid implementation.

AMI networks generally do not have all the capabilities required to support Smart Grid applications over and above meter reading and demand management. Significantly, the AMI network usually does not use the electrical grid as a transmission medium. It monitors only the metered load points, and hence does not detect electrical changes and conditions elsewhere on the distribution grid. Further, data-carrying capacity from the edge to the central concentrators is typically adequate for meter data and little more. Sophisticated Smart Grid applications for energy conservation, asset protection, non-technical loss detection, load balancing, fault isolation, and recovery management require accurate information about the schematic relationship of grid assets, load and conditions on the several segments of the grid, and the current state of bi-modal and multi-modal assets. This information, together with the geospatial locations of the same assets, is called a grid map and is typically stored in a database. In general, AMI networks have neither the monitoring capability nor the bandwidth to provide these types of information, with the result that present-day grid map databases are seldom updated in real time.

Utilities typically maintain two maps or models of the distribution grid. A Physical Network Model (PNM) aggregates the geospatial location of the assets on the grid. PNMs, thanks to modern GPS technology, are reasonably accurate with respect to point assets such as substations, capacitor banks, transformers, and even individual meters. Inaccuracies stem from failure to update the maps when repairs or changes are made. For example, a service transformer may move from one side of a street to the other as a result of street widening. Such a move may additionally result in a change in the partitioning of metered loads among the service transformers in an area.

Longitudinal assets, especially buried cables, are less well represented in the PNM. The PNM can contain as-designed data regarding the location of the longitudinal assets, but since in many places the cable was laid before global positioning technology had matured, the designs were based on ground-level survey, and the original maps may or may not have been updated to reflect changes. Therefore, the location from the as-designed data may be inaccurate, and subsequent surface changes complicate the problem of verifying the geographic path taken by medium-voltage and low-voltage distribution lines.

The second model is the Logical Network Model, or LNM. LNMs describe how grid components are connected, without reference to their geospatial location. The LNM changes frequently. During the course of repairs, the way transformers attach to taps and laterals, and the way meters attach to transformers, may be altered. Such changes may affect both the LNM and the PNM. In many utilities, such changes are recorded manually by field agents. The manual reports may or may not be updated in the LNM and PNM, and when updates are made the time lag between maintenance occurring and its being recorded could be significant.

The "last mile" problem of grid mapping involves determining what service transformer, and what phase or phases of the service transformer in cases where the transformer is multi phase, powers a particular meter. In locales where transformers are mounted on poles and tap lines are above ground, one might think this would be obvious. However, in those locales, it is very easy after an outage caused by a storm, a traffic accident, or scheduled construction, for repairs to be made in such a way as to change the transformer to which a meter is attached. In dense neighborhoods it is not always apparent how bundled and criss-crossing power lines connect buildings to transformers, especially when multiple transformers are attached to one pole.

In cases where transformers are pad-mounted or underground, and taps run underground, the construction may pre-date grid mapping. In that case, the only data that may be available are schematic designs made by survey. In general, no reliable record exists of whether the "last mile" of the grid was built strictly according to specification, or what has been the effect of subsequent modifications. When the taps are not visible, obtaining an accurate map of a TAN is labor intensive at best.

Practical benefits of having accurate TAN-level grid maps are asset protection and theft detection. The two go somewhat hand in hand, as unmetered power theft is a cause, though not the only cause, of transformer overload. What is needed is an accurate TAN map to help firmly establish that all power drawn from a transformer is metered, and to allow for large unpredictable loads, such as quick-charging electric vehicle batteries, to be arbitrated. An accurate TAN map is also helpful in planning and ordering repairs, upgrades, and modifications at the edge of the distribution grid

SUMMARY OF THE INVENTION

The present invention is an apparatus and method to reliably determine the transformer powering each metered load in one of a collection of candidate TANs. The single TAN to which a specific metered load belongs may be unknown because of the age of the distribution grid, because variations between the grid plans and the actual grid as built, because of changes and repairs over time, and so on. The collection of candidate TANs is typically chosen simply by proximity to the load or loads in question, but may also be chosen according to whatever existing plans or grid maps are available. Determining the supplying transformer by visual inspection is often difficult, as will be illustrated herein below. Because existing service transformers are deployed in a variety of form-factors, and because opening the transformer enclosure while the transformer is operational is undesirable, multiple embodiments of the invention operate by contacting only the exterior enclosure of the transformer. Some embodiments of the invention operate without touching the transformer at all.

The invention comprises an on-grid Transmitter operable to transmit a signal on the power line delivering power to a consumer, and a receiver device operable to detect the audio-frequency mechanical resonance at the service transformer caused by the signal. The receiver device (or simply, the Receiver) comprises an audio-frequency detector such as a microphone or a vibration sensor, a digitizer and a CPU or digital signal processing device for recognizing the vibrations from the signal and discriminating between the signal and other line noise that may also cause audio resonance at the service transformer, and a method of displaying, transmitting, and/or recording successful recognition of a signal.

A method of accurately determining which of several service transformers in a neighborhood or commercial/industrial development is powering a given service point (i.e. where a meter exists or is to be placed) is necessary if a grid map that extends all the way to the edge of an electrical distribution service area is to be created. One method of quickly mapping the association of a collection of meters to their transformers is to first equip each of the service transformers in a neighborhood or development with a Receiver, either by attaching a Receiver to the exterior of each service transformer cabinet, or by aiming a Receiver with a sensitive directional detector such as a directional microphone at each transformer. A Transmitter at one service point is made to transmit a locator signal at regular intervals until a Receiver at one service transformer indicates that it has detected the locator signal. The identity of the Receiver that detected the locator signal is recorded, and the process is repeated at a second service point, until all the service points in the area being mapped have transmitted a locator signal which has been detected by a Receiver. Failure to detect a signal from a given service point may indicate that a Receiver needs adjustment, or it may indicate that the service transformer that supplies the given service point has not been equipped with a Receiver.

In one embodiment of the invention, the Transmitter device is carried from service point to service point by a field engineer. To transmit from a selected service point, the field engineer unplugs the meter from the service point, plugs the Transmitter into the meter socket, and waits for a detection notice from a Receiver. The Transmitter may begin signaling as soon as it receives power, the signal may be triggered manually by the field engineer, or the signal may be triggered via an interface with a mobile computing device such as a laptop, tablet, smartphone, or purpose-built device with computing, storage, and communication capabilities, also carried by the field engineer. In one embodiment, the Receiver is also carried by the field engineer. The Receiver may have a long-range detection mechanism such as a shotgun microphone that may be aimed at a candidate transformer while the Transmitter is signaling. This method is preferred when only one or a small number of meters need to be mapped. Otherwise, the multiplicity of candidate transformers is typically equipped with Receivers prior to beginning the signaling process.

A detection notice may be received by the Transmitter unit itself, or by the mobile computing device. The detection notice may be transmitted from the Receiver using any appropriate wired or wireless technology, including cellular, Bluetooth, line-of-sight Infrared, Wi-Fi, or direct unregulated radio-frequency. The Transmitter, Receiver, and/or handheld mobile computing devices may be operable to select from a plurality of wired or wireless technologies so as to employ the technology that works best in a particular area. When all service points have been tested, the outcome data is extracted from the recording unit or units, whether it is the Transmitter or a mobile device, and loaded into a Grid Map database.

Alternatively, the Receiver itself may record every signal detection event. The installer may wait a fixed interval of time per service point after activating the Transmitter rather than waiting for a detection indicator. After all targeted service points have been tested, the installer collects the Receivers, extracts the recorded data from each Receiver, merges the extracted data, and loads it into a grid map or other database. In this embodiment, no separate wired or wireless communication may be needed.

As another alternative, the on-grid Transmitter may be a component of the electrical meter itself. A suitable on-grid Transmitter integrated with a meter is described in U.S. patent application Ser. No. 13/871,944, titled A System and Method for Inferring Schematic and Topological Properties of an Electrical Distribution Grid, which is incorporated herein by reference. Such a meter can receive commands from and upload data to a mobile computing device, via a wired or wireless interface, such as Infrared, Bluetooth, USB, or RS-232. In this embodiment, the field engineer equips the candidate service transformers with Receivers, then commands each targeted meter in turn to transmit one or more detection signals. When all targeted meters have transmitted, the field engineer collects the Receivers or information recorded by the Receivers and consolidates the outcome data as before.

In yet another embodiment, the electrical meters operable to transmit a detection signal may be part of a two-way data communications network such as an Advanced Metering Infrastructure, or AMI. In such cases, the field engineer may not be required to visit each targeted meter. Instead, the candidate service transformers may be equipped with Receivers. Then, each targeted meter in turn is commanded via the two-way network to transmit a detection signal as before. After all targeted meters have transmitted, the Receivers are collected and the outcome data consolidated as before.

The method for uniquely identifying each targeted service point may include using barcodes, QR codes, RFID tags, or other known identification means on the meters. Either the field engineer's mobile device or the mobile Transmitter unit may have a barcode, QR code, or RFID reader, which may be used to read the barcode, QR code, or RFID tag on the meter at the service point. Alternately, when the Transmitter unit is a component of the meter, a barcode/QR code/RFID reader may not be required because the meter stores the unique identifier internally. The Transmitter may also have access to a GPS signal. The GPS signal may be obtained from a GPS receiver located in the field engineer's mobile unit, the mobile Transmitter unit, or the electrical meter at the service point. A GPS signal provides both the geospatial coordinates of the targeted service point and a timestamp. Each service point may thus be identified by at least one of the geospatial coordinates of the service point, the meter barcode, QR code, or RFID tag, and another unique identifier known to the meter logic.

The detection signal transmitted by a Transmitter comprises at least a pre-determined locator pattern that allows a Receiver to determine that it has received a bona fide detection signal and not some other on-grid transmission. The detection signal may additionally include a unique identifier for the service point, the geospatial coordinates of the service point and/or a timestamp. The data elements of the detection signal, including but not limited to, the identifier, coordinates, and timestamp, may be encoded using any suitable modulation technique and transmitted in conjunction with the locator pattern. The data elements may be transmitted either before or after the locator pattern. The frequency or frequency band of the transmission will typically reside within the pass-band range of the service transformer. This is typically within the audio frequency band. The power level of these transmissions is stepped monotonically from low power to high power until detection occurs to minimize false propagation of signals. Because false detections may occur if the detection signal propagates to the high-voltage side of the service transformer powering the Transmitter, allowing other Receivers than the one associated with the powering service transformer to detect the signal, transmitters may be configurable to tune the detection signal to a higher frequency range (i.e. above the pass-band frequency range of the transformer) if false positives are reported.

Another aspect of the invention is the composition of the locator pattern. The pre-determined locator pattern is known to the Receivers, and may consist of a sequence of one or more pure tones transmitted at known frequencies, or one or more groups of two or more pure tones transmitted simultaneously, or another easily recognized pattern. Typically, but not necessarily, the locator pattern will precede any variable portion of the transmission, so as to minimize the complexity of demodulation.

In some embodiments, the Receivers may embody no capability to demodulate a variable message, but only a simple recognizer for detecting locator patterns. In such embodiments, the Receiver and either the Transmitter unit or the mobile computing device can record events, and have access to the same precise timing signal, such as a GPS signal. The recorder for the Transmitter unit or mobile device records the transmission timestamp, and the identity of the service point and/or its geospatial coordinates. The recorder for the Receiver unit records only a timestamp and the unique identity of the Receiver. The Receiver unit may have been programmed with the geospatial coordinates of the associated service transformer, in which case these are also associated with the Receiver's record. The mapping of service points to service transformers is determined after collecting all the data records representing both send and receive events. This mapping may be done by matching the send and receive timestamps to within a tolerance that is established by the extent of the service area.

The Receiver unit may be placed in adequate proximity to the service transformer to detect the audio resonance created in the service transformer coils by the locator pattern. Service transformers may be mounted on electric poles, mounted on a concrete pad at ground level, or buried under ground. Underground transformers typically are accessible by service tunnels, man-holes, or similar built-in access ways.

For pole-mounted transformers, a device called a "hot stick" may be used to elevate the Receiver unit to the transformer. The Receiver unit may be held in proximity to the typically non-magnetic transformer housing by clamping to the pole or the transformer housing, or by temporary adhesives. Alternately, a Receiver unit with a long-range contact-free vibration sensor may be installed at ground level or held by a field engineer. For pad-mounted and underground transformers, the Receiver unit may be attached to the transformer housing by hand, adhering the unit to the housing by means of suction cups, magnets or temporary adhesives. Clamps, brackets, bolts, and the like may also be used, but preferred embodiments are installable and removable quickly and do not require modifying or opening the transformer housing.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
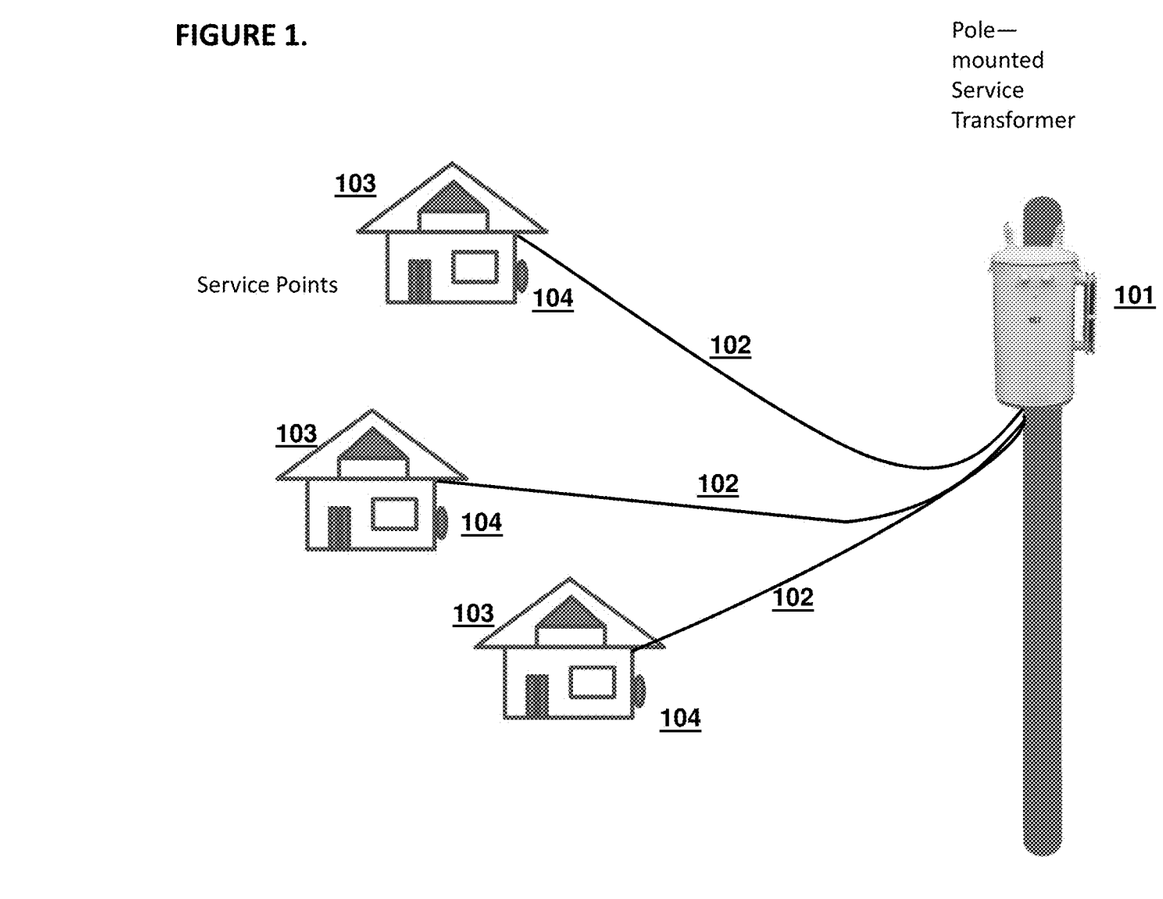
FIG. 1 illustrates a simple radial above-ground Transformer Area Network.
Figure 2:
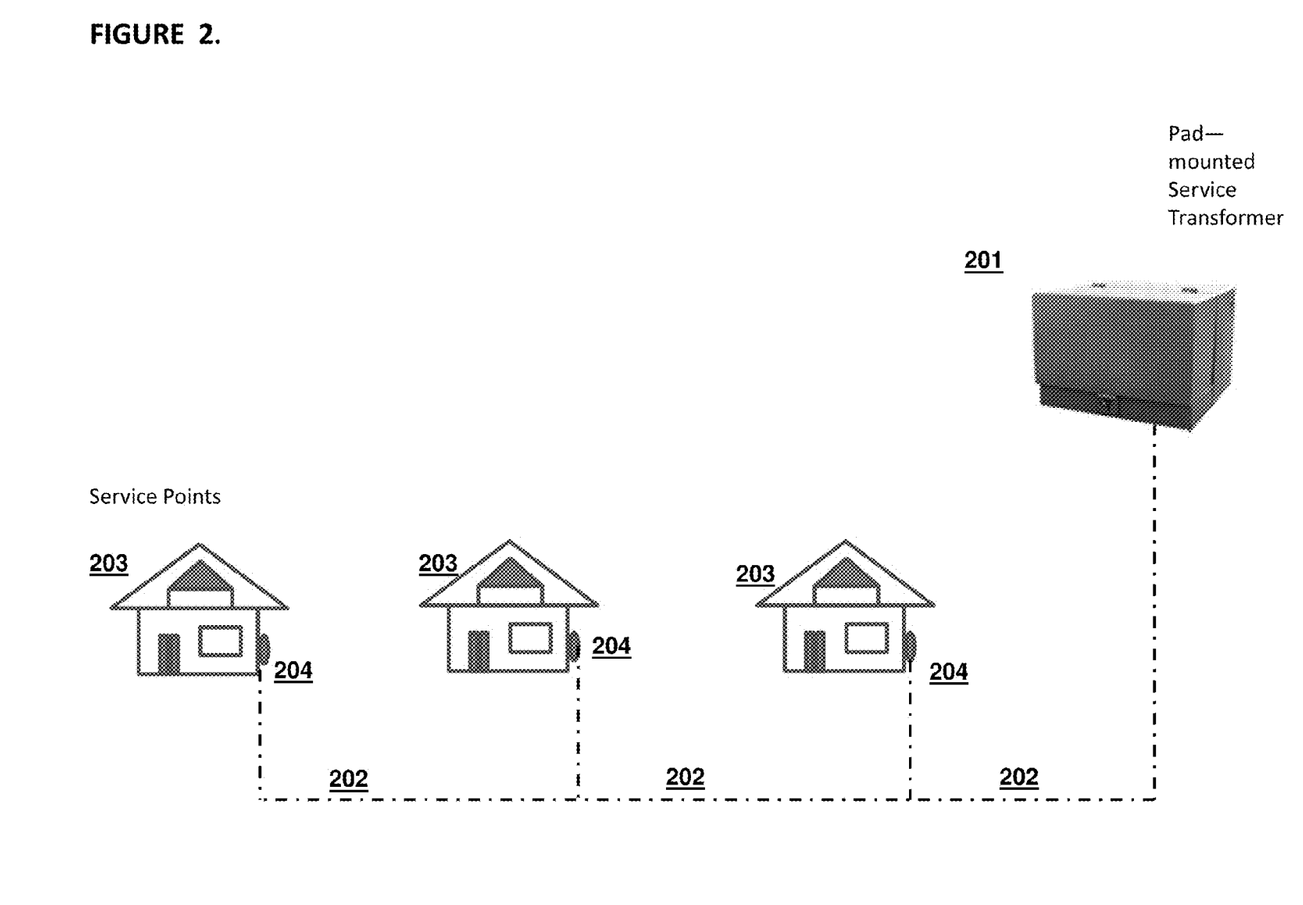
FIG. 2 illustrates a simple bus topology underground Transformer Area Network.
Figure 3:
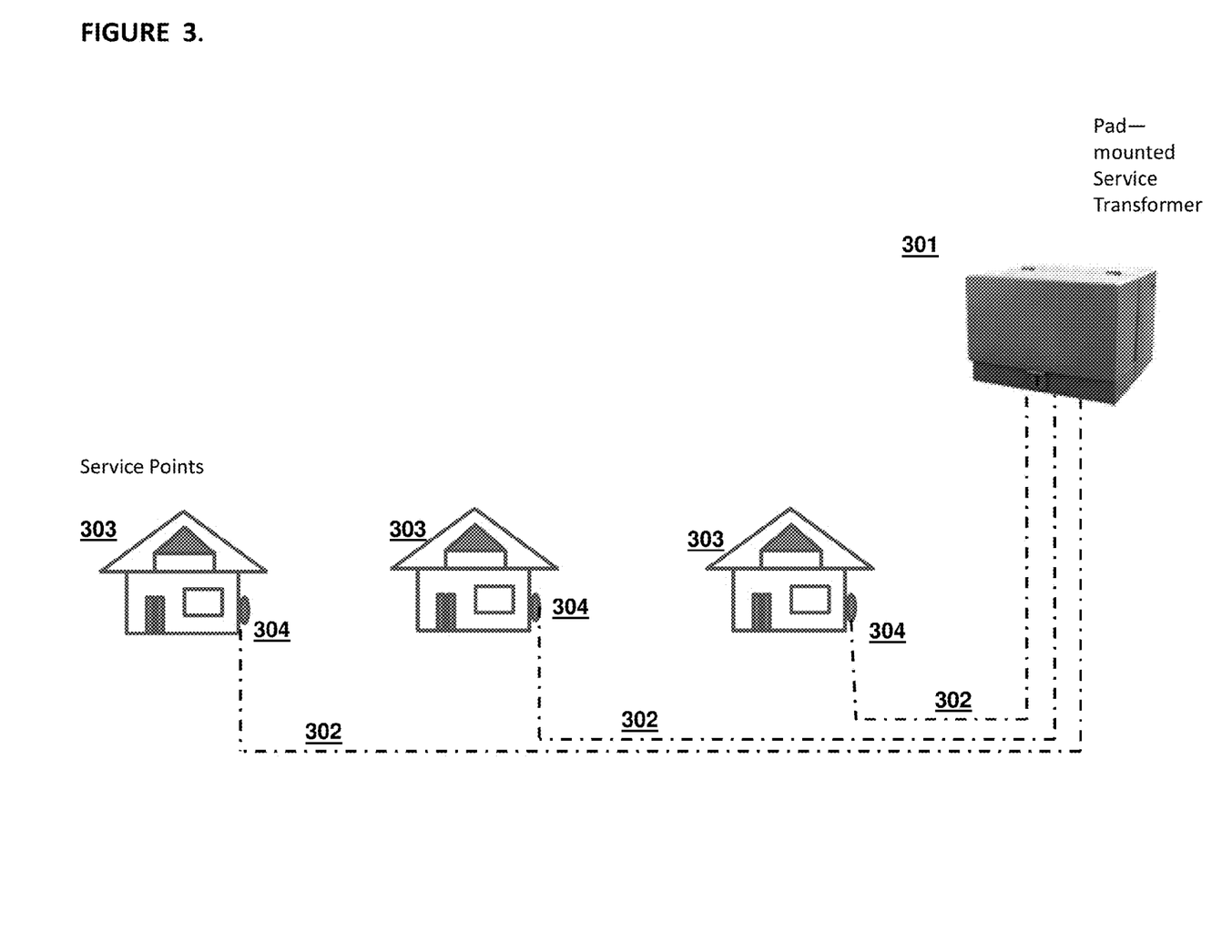
FIG. 3 illustrates a simple radial underground Transformer Area Network.

Refer now to FIG. 1, which illustrates a typical single-phase pole-mounted transformer 101 connected via aerial power lines 102 to residences 103. In the United States, this is a typical configuration, especially in older areas. Power lines to residences are typically attached to the eaves of the roof, with the power lines traveling downward to the meters 104 in conduit on the exterior of the residences 103. FIG. 2, by contrast, illustrates a bus topology for the transformer area. In FIG. 2, a pad-mounted transformer 201 connects via a linear buried line 202 connected to residences 203 at meters 204. This topology is common in Europe and other foreign countries. A typical installation might serve many more meters than shown: the average number of meters per single-phase transformer in the US is approximately six (6), but in Europe it is common to have dozens of meters per transformer. FIG. 3 shows a typical US buried-cable installation, where a pad-mounted transformer 301 is connected radially via buried cable 302 to residences 303 at meters 304. These three basic configurations, with minor local variations and multi-phase variations for industrial and commercial applications, represent most electrical distribution networks worldwide.

Figure 4:
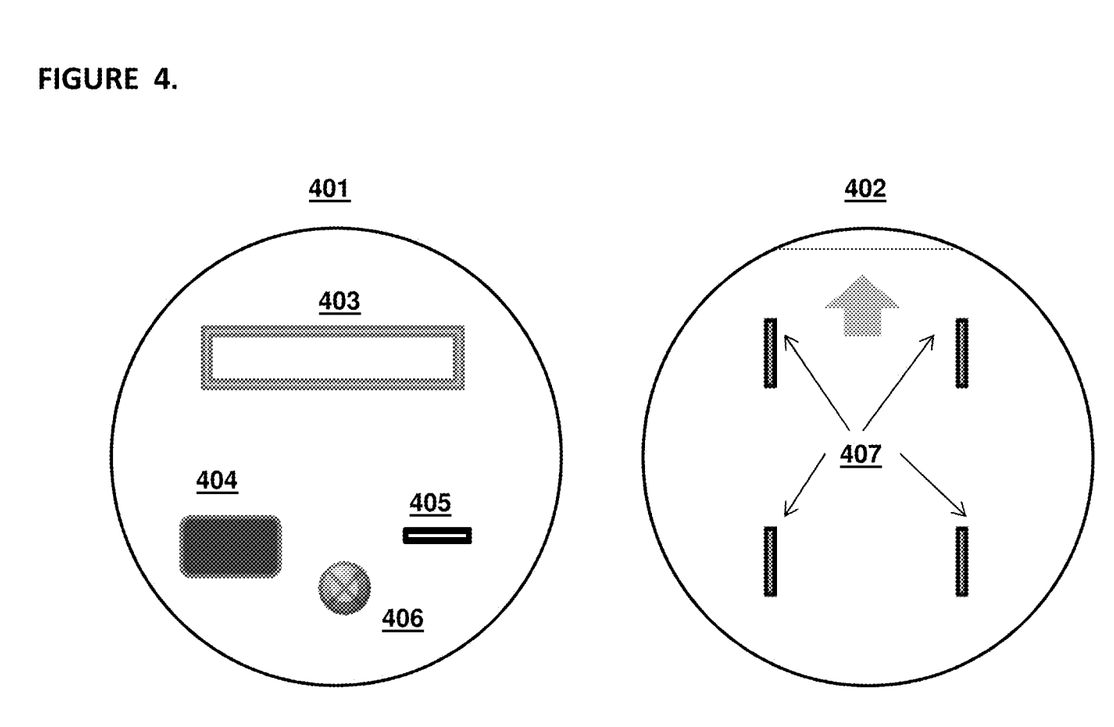
FIG. 4 illustrates the front and obverse of a portable Transmitter which plugs into a meter socket.

FIG. 4 depicts the face 401 and the obverse 402 of a portable Transmitter unit configured, for example, to be plugged into a US standard 2 S meter socket. The obverse shows the tines or "stabs" 407 that plug into the meter socket. The face of the Transmitter may contain a human-readable display 403, such as an LED display, an optical I/O port 404, a USB port 405, and a button 406 for manually activating and deactivating the signal. Other combinations of indicators and interfaces may be used. Ports 404 and 405 may be used to input programming, coordinates, timestamps, signal settings such as frequency band, power level, interval between signals, and the like. The ports may also be used to extract event data from the device when the Transmitter unit incorporates an automatic recording system for transmission events or when the unit incorporates a communication mechanism for collecting and recording events from a Receiver. A similar device to the one shown in FIG. 4 may be made for any type of meter socket in use in the United States or abroad. The Transmitter may also be configured to plug into an ordinary electrical outlet. Because the configuration of stabs and outlets and also the AC voltage provided varies by locale, by meter standard, and by outlet standard, multiple variants of the Transmitter unit may be required to adapt to the type of power and connectivity available. The basic electronic, display, and i/o components of any Transmitter embodiment could remain the same from variant to variant.

Figure 5A:
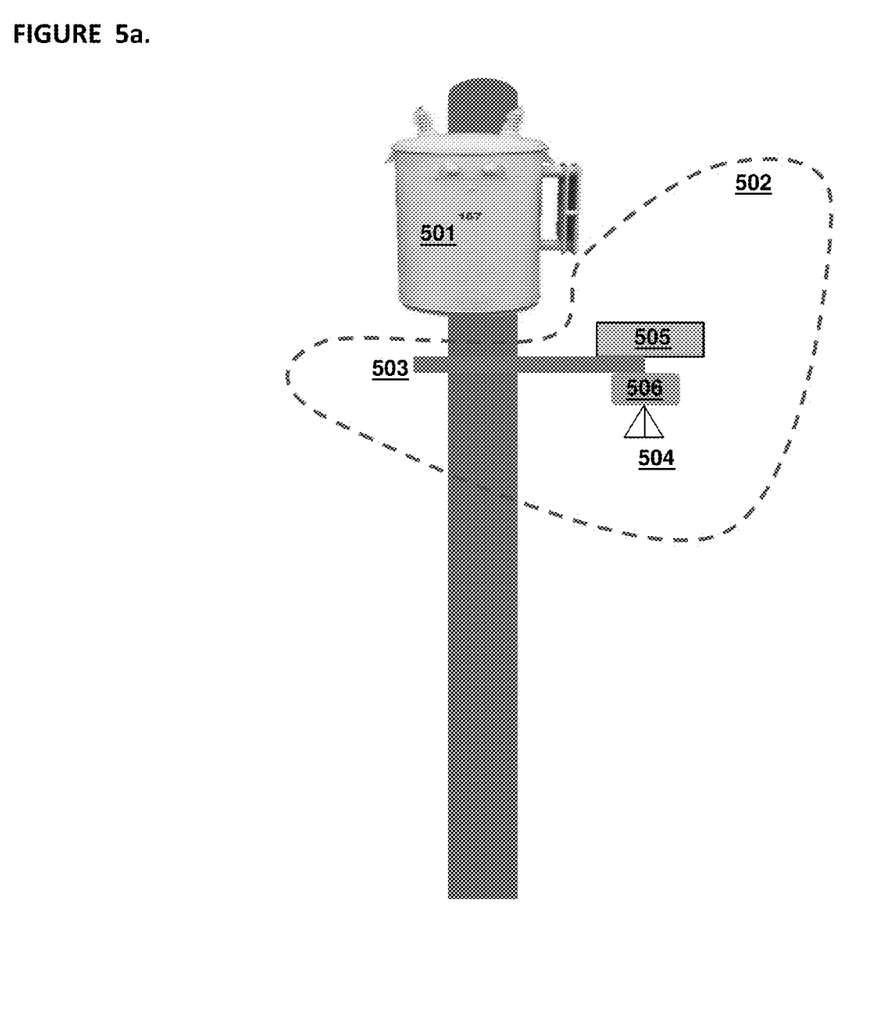
FIG. 5a illustrates one embodiment of a Receiver designed for use with pole-mounted transformers.

FIG. 5a depicts a first embodiment of a Receiver device. Pole-mounted variant 502, comprising the components inside the dotted shape on FIG. 5a, clamps to the power pole, or to the housing of a pole-mounted transformer 501. This may be done using any type of clamping device, such as a spring-loaded clamp. It may be installed and removed using a hot-stick device to avoid the use of a "cherry picker" lift, which is more costly. The components of variant 502 may include clamp 503, antenna 504 for an optional wireless communication module, vibration sensor 505, and control unit 506. The vibration sensor 505 may be a contact or non-contact vibration sensor, such as, but not limited to, an accelerometer, directional microphone or laser vibrometer. The control unit may contain circuitry for recognizing a locator pattern, and it may also contain signal processing logic for demodulating data included in the signal. Additionally, the control unit may contain a communication module for transmitting detection events to a recording device located elsewhere, or an internal mechanism for recording detection events, or both.

Figure 5B:
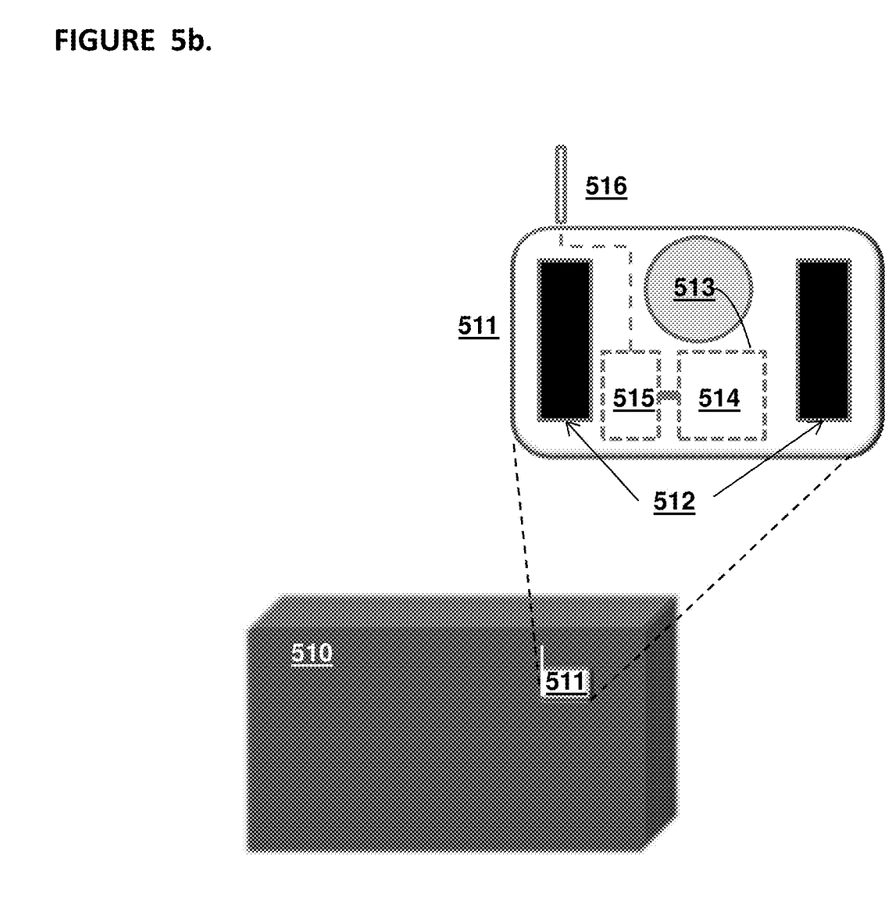
FIG. 5b illustrates a second embodiment of a Receiver designed for use with pad-mounted transformers at or below ground level.

FIG. 5b depicts a second embodiment of a receiver device. Receiver variant 511 is designed for use with pad-mounted transformers 510 having ferro-magnetic housings. The Receiver may adhere to the housing by means of attachment devices such as magnets 512, and detects locator patterns by means of vibration sensor 513, such as an accelerometer. Other attachment devices such as adhesives or suction cups may be substituted for magnets 512. Vibration sensor 513 may include a spring device to ensure strong mechanical contact with the housing. Antenna 516 is connected to a wireless communication module 515, which receives event notifications for wireless transmissions from a computation unit 514. The computation unit may also incorporate a memory unit for recording detection events. As with pole-mounted device 502, this unit may incorporate a variety of interface ports and display options.

Figure 5C:
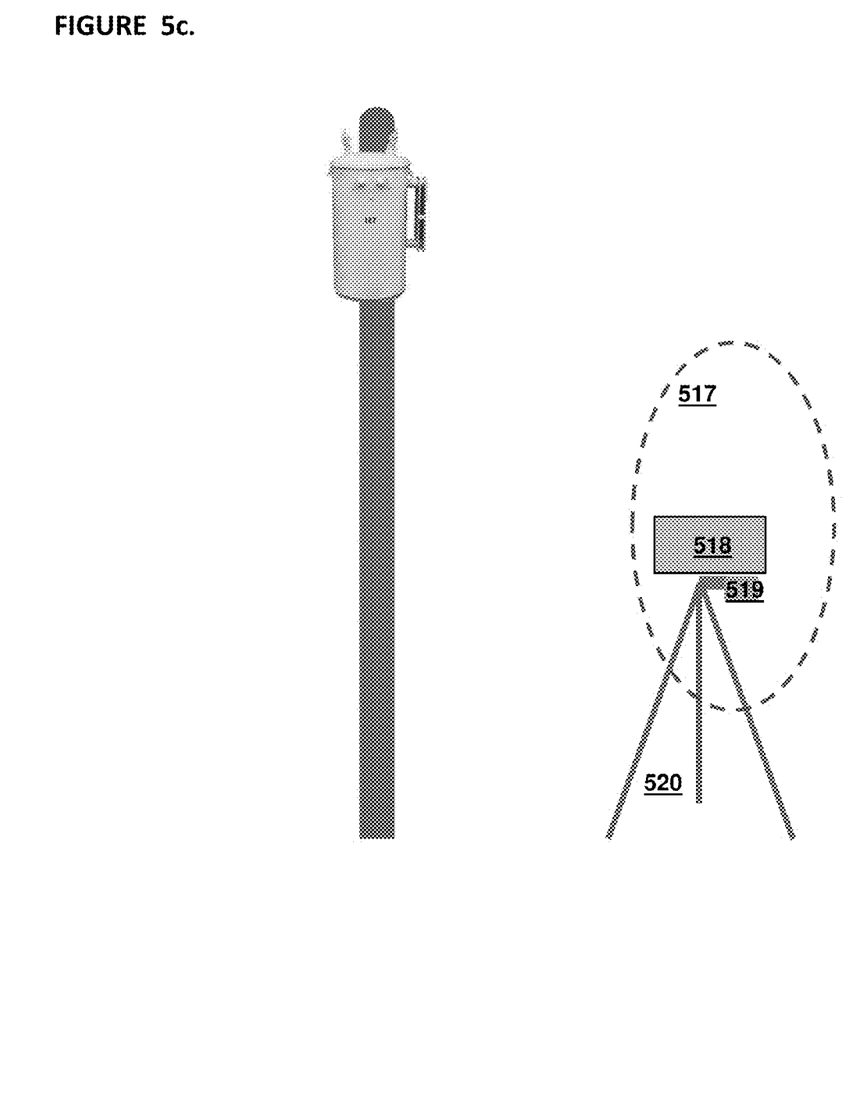
FIG. 5c illustrates a third embodiment of a Receiver which may be hand-carried or mounted on a tripod resting on the ground.

FIG. 5c depicts a third embodiment of a receiver device. In FIG. 5c, Receiver variant 517, comprising the components inside the dotted shape on FIG. 5c, is mounted on tripod 520. Receiver 517 may be detached from tripod 520 to be carried and aimed manually by a field engineer or installer. The Receiver consists of non-contact vibration sensor 518 and control unit 519. The non-contact vibration sensor 518 may be, but is not limited to, a laser vibrometer or directional microphone.

Figure 6:
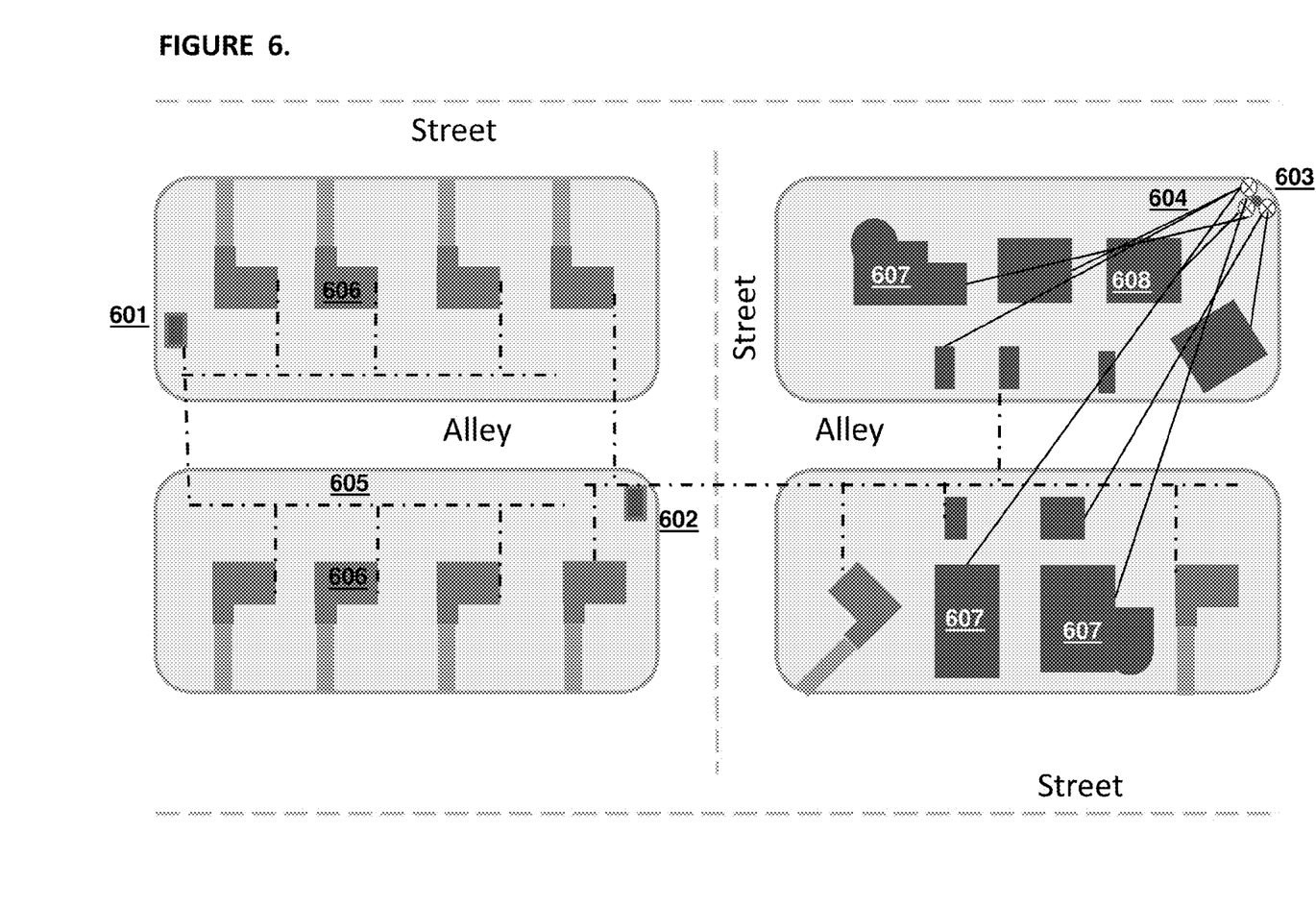
FIG. 6 illustrates an aerial view of a residential neighborhood containing buildings of different ages, part of which is served by overhead distribution lines and part of which is served by buried distribution cables.

FIG. 6 shows an aerial view of an illustrative example of an urban residential neighborhood as is typical in the United States. The area comprises a grouping of older, Victorian era homes (607, 608) with separate carriage houses facing the alleyway, and modern infill housing (606) with attached garages and driveways facing the street. The neighborhood was electrified in several stages. First, power was provided to the original homes in the neighborhood via pole-mounted transformers. Electric pole 603 has three single-phase transformers. Overhead lines 604 distribute power to the older homes (607, 608). Overhead lines 604 are typically attached to the eaves of the houses and routed to exterior meters via exterior conduit. As the carriage houses were modernized later in the 20$^{th}$ century, additional taps from the pole-mounted transformers to new meters may have been added, or in some cases the carriage house receives power via the tap and meter for the main building. Some carriage houses were not modernized during this era. Still later, perhaps in the 1980s, new development (606) prompted the installation of buried cables to meet the typically greater needs of modern structures. Two pad-mounted transformers 601 and 602 deliver power to the new homes in the area, and also to some of the last carriage houses to be modernized. Buried cable 605 could have either a radial topology as in FIG. 3 or a bus topology as in FIG. 2, the likely topology depending primarily on the locale of the neighborhood.

FIG. 6 and its history make it apparent why the utility servicing this neighborhood would not have a clear idea which house in this neighborhood is supplied by which transformer, and why even an engineer on the scene could not readily determine the mapping without technological assistance such as the present invention.

The following is an example of the implementation of the system and methods described herein with reference to FIG. 6. Residence 608 decides to upgrade its service so as to electrify its carriage house and improve the wiring in the house, adding 220 v service for an electric dryer and increasing the number of circuits in the home. Some of the pole-mounted transformers in the neighborhood are known to be heavily loaded. An electrician removes the meter from residence 608 and substitutes a portable Transmitter unit such as that described in FIG. 4, which he then activates. The electrician then approaches the grouping of pole-mounted transformers 603 with a hand-held Receiver unit incorporating a directional sensor such as a shotgun microphone, aiming the microphone at each transformer. The electrician detects the audio-frequency mechanical resonance of the locator signal at each transformer, and further determines which transformer shows the greatest level of resonance with the locator signal from the Transmitter. Identifying the transformer supplying the house informs the decision of whether to simply make the desired home upgrades, move the house to one of the other aboveground phases, or convert the home service to buried cable by attaching it to pad-mounted transformer 602, which is under-utilized.

Figure 7:
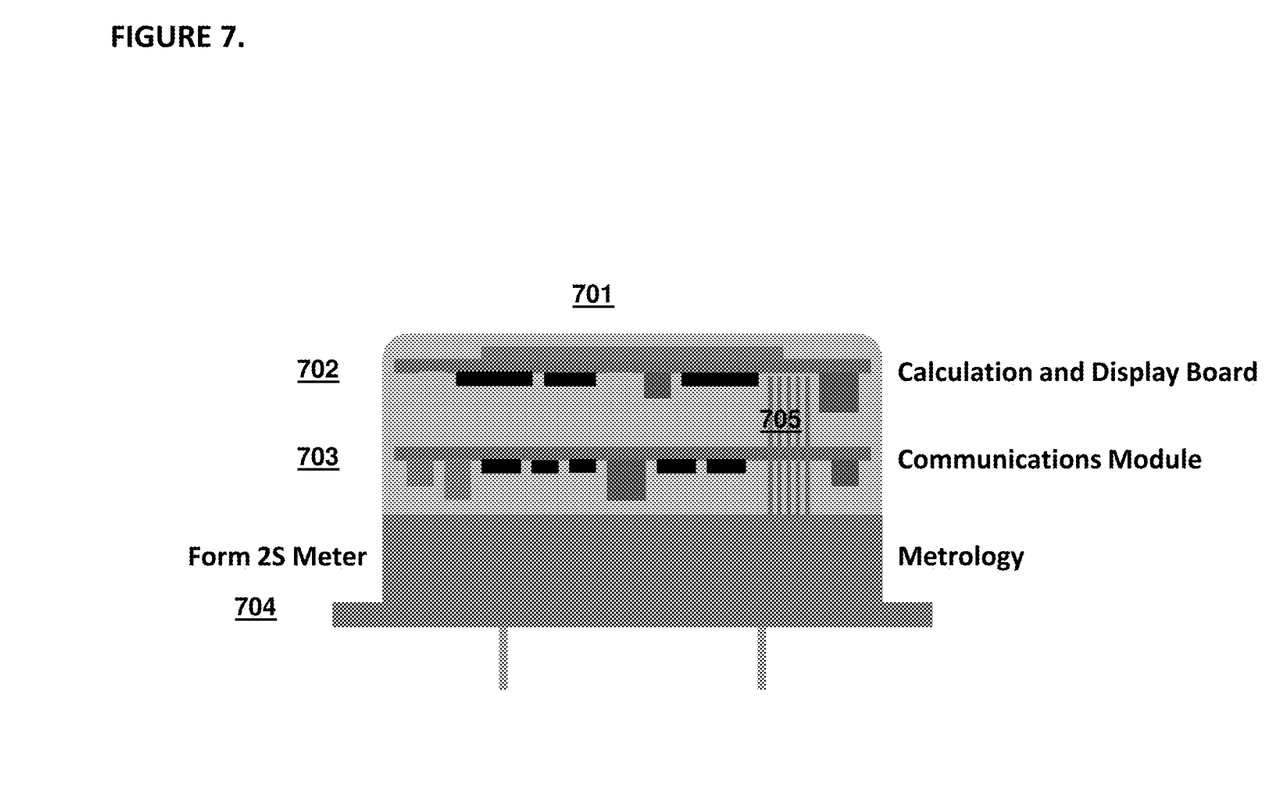
FIG. 7 illustrates an elevation of a standard Form 2s residential meter, showing how a Transmitter module may be added via an optional Communications Module in the meter.

FIG. 7 illustrates how a Transmitter unit 703 may be incorporated into a Smart Meter 701. The Smart Meter may have a Calculation and Display board 702 and a Metrology unit 704. To accommodate a multiplicity of communication architectures for AMI networks, the meters may have space for a second circuit board to be added, generally for a secondary AMI mechanism. In FIG. 7, this space has been used for a Transmitter unit, which may incorporate a wireless transceiver, a computation unit with a memory unit for recording events, a GPS receiver, and the like. The Transmitter unit 703 may interact with components such as a primary AMI mechanism, physical or optical communication ports, and the meter display via interface 705.

The following is another example of the implementation of the system and methods described herein, again with reference to FIG. 6. In this second example, the neighborhood in question is part of a new AMI deployment wherein all the area's electrical meters are being swapped out, and the utility decides to take the opportunity to extend its grid map to the edge of the network while field engineers are in the area. The AMI meters being deployed are similar to those described in FIG. 7, operable to act as Transmitter units. Before beginning to swap out the old meters for the new, a field engineer attaches Receivers to pad-mounted transformers 601 and 602, and attaches Receivers to the pole-mounted transformers 603. For the purposes of this example, it is assumed that each Receiver is operable to record the detection events for its own transformer. As each new Smart Meter 701 is deployed, it transmits a detection signal for a fixed number of repetitions over a short interval such as 1 minute, ensuring that a Receiver will pick up its locator pattern. The power of the detection signal may be stepped up until a Receiver signals detection back to the Transmitter. Alternately, the Transmitter may employ a fixed number of steps, and each Receiver that detects the signal records only the lowest-power signal it receives. The Receiver recording the earliest time may be presumed to be the correct one. The field engineer may choose to refrain from installing a second meter until the first meter has ceased transmitting, so as to avoid having one detection signal interfere with another. When all the meters have been installed, the field engineer collects the Receivers or information recorded by the Receivers and uploads the recorded detection events to a grid map or other database for long-term storage and processing.

The foregoing description of the invention has been presented for purposes of illustration and description and is not intended to be exhaustive or to limit the invention to the precise forms disclosed. Obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. A system for determining, in an electrical distribution grid, which of one or more candidate service transformers is supplying power to at least one load, as represented by a meter socket or an electrical outlet, the system comprising:
   a. at least one on-grid transmitter configured to inject at least one detection signal when powered by the meter socket or the electrical outlet of the at least one load;
   b. at least one receiver configured to detect resonant mechanical vibrations or sound caused by the at least one detection signal in a candidate service transformer supplying power to the specific transmitter which is the source of the at least one detection signal; and
   c. a recording mechanism configured to record a pairing of the at least one load with a candidate service transformer of the one or more candidate service transformers.

2. The system of claim 1, wherein the transmitter is a portable unit configured to plug into a meter socket of a load in place of an electrical meter.

3. The system of claim 1, wherein the transmitter is a component of an electrical meter.

4. The system of claim 1, wherein the transmitter has access to a GPS signal.

5. The system of claim 1, wherein the recording mechanism is manual.

6. The system of claim 1, wherein the recording mechanism is a recording unit comprising at least a processor and computer-readable memory.

7. The system of claim 1, wherein the recording mechanism is a component of the receiver.

8. The system of claim 1, wherein the recording mechanism is a component of the transmitter.

9. The system of claim 1, wherein the recording mechanism is a component of a mobile computing device.

10. The system of claim 1, wherein the recording mechanism includes at least one interface for uploading recorded events to another device.

11. The system of claim 1, wherein the transmitter includes a mechanism for transmitting an event to the recording mechanism.

12. The system of claim 1, wherein the receiver includes a mechanism for transmitting an event to the recording mechanism.

13. The system of claim 1, wherein the receiver is configured to distinguish the at least one detection signal from other signals and noise which may cause resonant vibrations in a transformer.

14. A method for establishing that a service transformer is delivering identifying a service transformer that provides electrical power to a load, comprising the steps of:
generating, by a transmitter coupled to one of a meter socket or an electrical outlet of a load that receives electrical power from an electrical distribution grid, a detection signal;
injecting, by the transmitter, the detection signal into the one of the meter socket or the electrical outlet of the load;
detecting, by a receiver, at least one of a resonant mechanical vibration or a sound caused by the detection signal in a service transformer that provides electrical power to the load;
recording a detection by the receiver of the resonant mechanical vibration or the sound caused by the detection signal in the service transformer and an identity of the service transformer in a detection event record; and
incorporating the detection event record into a database.

15. The method of claim 14, wherein the detection signal further comprises a locator pattern, the method further comprising:
generating, by the transmitter, the locator pattern as one of a known sequence of one or more pure tones or as a sequence of one or more combinations of one or more tones transmitted simultaneously.

16. The method of claim 14, further comprising including a timestamp in the detection signal.

17. The method of claim 14, further comprising including the geospatial coordinates of the one of the meter socket or the electrical outlet powering the transmitter in the detection signal.

18. The method of claim 14, further comprising including a unique identifier of an electrical meter in the detection signal.

19. The method of claim 14, further comprising including a serial number of the transmitter in the detection signal.

20. The method of claim 14, further comprising recording a unique identifier of the receiver in the detection event record.

21. The method of claim 14, further comprising recording additional data in the detection event record.

22. The method of claim 14, further comprising recording a time at which the receiver detects the at least one of the resonant mechanical vibration or the sound caused by the detection signal in the detection event record.

23. The system of claim 1, wherein the receiver is mounted at the candidate service transformer without modifying the candidate service transformer or a housing of the candidate service transformer and without disrupting operation of the candidate service transformer or opening the housing of the candidate service transformer.

24. A receiver for identifying a service transformer that provides electrical power to a load in an electrical distribution grid, comprising:
an audio frequency detector configured to detect at least one of a resonant mechanical vibration or a sound in a service transformer;
a processor, coupled to the audio frequency detector, configured to distinguish the at least one of the resonant mechanical vibration or the sound caused by a detection signal from other resonant mechanical vibrations or sounds in the service transformer; and
a recording mechanism, coupled to the processor, configured to record an event comprising a determination that the at least one of the resonant mechanical vibration or the sound in the service transformer is caused by the detection signal.

25. A method for identifying a service transformer that provides electrical power to a load in an electrical distribution grid, comprising:
detecting, by an audio frequency detector, at least one of a resonant mechanical vibration or a sound in a service transformer;
distinguishing, by a processor coupled to the audio frequency detector, the at least one of the resonant mechanical vibration or the sound caused by a detection signal from other resonant mechanical vibrations or sounds in the service transformer; and
recording, by a recording mechanism coupled to the processor, an event comprising a determination that the at least one of the resonant mechanical vibration or the sound in the service transformer is caused by the detection signal.

26. A transmitter for transmitting a detection signal, comprising:
a transmission circuit configured to transmit a detection signal;
a detection signal generator configured to generate the detection signal; and
an electrical plug, coupled to the transmission circuit, configured to electrically couple to one of a meter socket or an electrical outlet of a load,
wherein the transmitter is configured to:
generate the detection signal to cause at least one of a resonant mechanical vibration or a sound in a service transformer that provides electrical power to the load; and
inject the detection signal into the one of the meter socket or the electrical outlet of the load.

27. The transmitter of claim 26, wherein to generate the detection signal the transmitter is further configured to generate a locator pattern comprising one of a known sequence of one or more pure tones or as a sequence of one or more combinations of one or more tones transmitted simultaneously.

28. The transmitter of claim 26, wherein to generate the detection signal the transmitter is further configured to generate a locator pattern comprising a timestamp.

29. The transmitter of claim 26, wherein to generate the detection signal the transmitter is further configured to generate a locator pattern comprising geospatial coordinates of the one of the meter socket or the electrical outlet.

30. The transmitter of claim 26, wherein to generate the detection signal the transmitter is further configured to generate a locator pattern comprising a unique identifier of an electrical meter.

31. The transmitter of claim 26, wherein to generate the detection signal the transmitter is further configured to generate a locator pattern comprising a serial number of the transmitter.

32. A method for transmitting a detection signal to identify a service transformer that provides electrical power to a load in an electrical distribution grid, comprising:
- generating, by a transmitter, a detection signal to cause at least one of a resonant mechanical vibration or a sound in a service transformer that provides electrical power to a load; and
- injecting the detection signal into one of a meter socket or an electrical outlet of the load.

* * * * *

UNITED STATES PATENT AND TRADEMARK OFFICE
CERTIFICATE OF CORRECTION

PATENT NO. : 9,438,312 B2
APPLICATION NO. : 13/911849
DATED : July 15, 2014
INVENTOR(S) : Henrik F. Bernheim et al.

Page 1 of 1

It is certified that error appears in the above-identified patent and that said Letters Patent is hereby corrected as shown below:

In the Claims

On Column 11, Lines 14-16, replace:
"A method for establishing that a service transformer is delivering identifying a service transformer that provides electrical power to a load, comprising the steps of:" with --"A method for identifying a service transformer that provides electrical power to a load, comprising"--.

Signed and Sealed this
Twenty-sixth Day of November, 2019

Andrei Iancu
*Director of the United States Patent and Trademark Office*